US008695559B2

(12) United States Patent
Böhm

(10) Patent No.: US 8,695,559 B2
(45) Date of Patent: Apr. 15, 2014

(54) PISTON HAVING OIL SUPPLY CHANNEL FOR HUB BORE HOLES

(75) Inventor: Roland Böhm, Puschendorf (DE)

(73) Assignee: Federal-Mogul Nurnberg GmbH, Nuremberg (DE)

( * ) Notice: Subject to any disclaimer, the term of this patent is extended or adjusted under 35 U.S.C. 154(b) by 408 days.

(21) Appl. No.: 12/679,110

(22) PCT Filed: Jun. 13, 2008

(86) PCT No.: PCT/EP2008/057473
§ 371 (c)(1),
(2), (4) Date: Mar. 19, 2010

(87) PCT Pub. No.: WO2009/040148
PCT Pub. Date: Apr. 2, 2009

(65) Prior Publication Data
US 2010/0307444 A1  Dec. 9, 2010

(30) Foreign Application Priority Data

Sep. 24, 2007  (DE) .......................... 10 2007 045 465

(51) Int. Cl.
*F02F 3/00* (2006.01)
(52) U.S. Cl.
USPC ....................................................... 123/193.6
(58) Field of Classification Search
USPC .............. 123/193.6, 41.35; 92/159, 160, 187, 92/208; 277/455
See application file for complete search history.

(56) References Cited

U.S. PATENT DOCUMENTS

| 1,916,978 | A | * | 7/1933 | Harper, Jr. ...................... 92/160 |
| 2,702,219 | A | * | 2/1955 | Sintz et al. ...................... 92/160 |
| 3,494,262 | A | * | 2/1970 | Holcombe ....................... 92/159 |
| 3,515,035 | A | * | 6/1970 | Cuddon-Fletcher ............ 92/159 |
| 4,123,072 | A | * | 10/1978 | Sharpe ........................... 277/453 |
| 4,359,973 | A | * | 11/1982 | Shimada .................... 123/41.35 |
| 4,785,720 | A | * | 11/1988 | Kojima et al. ................. 92/159 |
| 4,987,866 | A | | 1/1991 | Mielke et al. |
| 5,695,199 | A | * | 12/1997 | Rao et al. ....................... 277/455 |
| 6,279,456 | B1 | * | 8/2001 | Ueshima et al. ................ 92/187 |
| 6,324,961 | B1 | * | 12/2001 | Akimoto et al. ................ 92/160 |
| 7,152,567 | B2 | * | 12/2006 | Anderson et al. ........... 123/193.6 |
| 7,278,390 | B2 | * | 10/2007 | Fezer ........................... 123/193.6 |
| 2003/0075137 | A1 | * | 4/2003 | Gaiser ......................... 123/193.6 |
| 2006/0086325 | A1 | * | 4/2006 | Rasmussen ................. 123/41.35 |
| 2006/0096557 | A1 | * | 5/2006 | Christain et al. ........... 123/41.38 |
| 2006/0162550 | A1 | | 7/2006 | Schlessmann et al. |

(Continued)

FOREIGN PATENT DOCUMENTS

| DE | 884 586 | | 7/1953 |
| DE | 3600749 | A1 | 7/1987 |

(Continued)

*Primary Examiner* — M. McMahon
(74) *Attorney, Agent, or Firm* — Robert L. Stearns; Dickinson Wright, PLLC

(57) ABSTRACT

A cylindrical piston for internal combustion engines, comprising a piston crown and a piston base, in the piston base a hollow space being provided, and in a piston base wall forming the hollow space pinholes being provided, characterized in that the outer circumferential surface in at least the piston base at least one oil guide is provided, the direction thereof having an axial component relative to the piston axis and the oil guide extending from the piston crown in the direction of a pinhole.

7 Claims, 1 Drawing Sheet

(56) References Cited

U.S. PATENT DOCUMENTS

2008/0202330 A1* 8/2008 Ottliczky et al. ............... 92/208
2008/0250922 A1* 10/2008 Hayes et al. .................... 92/158
2008/0264247 A1 10/2008 Buschbeck et al.
2011/0139114 A1* 6/2011 Nakazawa et al. ......... 123/193.6

FOREIGN PATENT DOCUMENTS

| DE | 10 2005 003061 A1 | 7/2006 |
| EP | 0 387 931 A | 9/1990 |
| JP | 57173540 A | 10/1982 |
| JP | 08 121243 A | 5/1996 |
| WO | WO 2006/072293 A | 7/2006 |

* cited by examiner

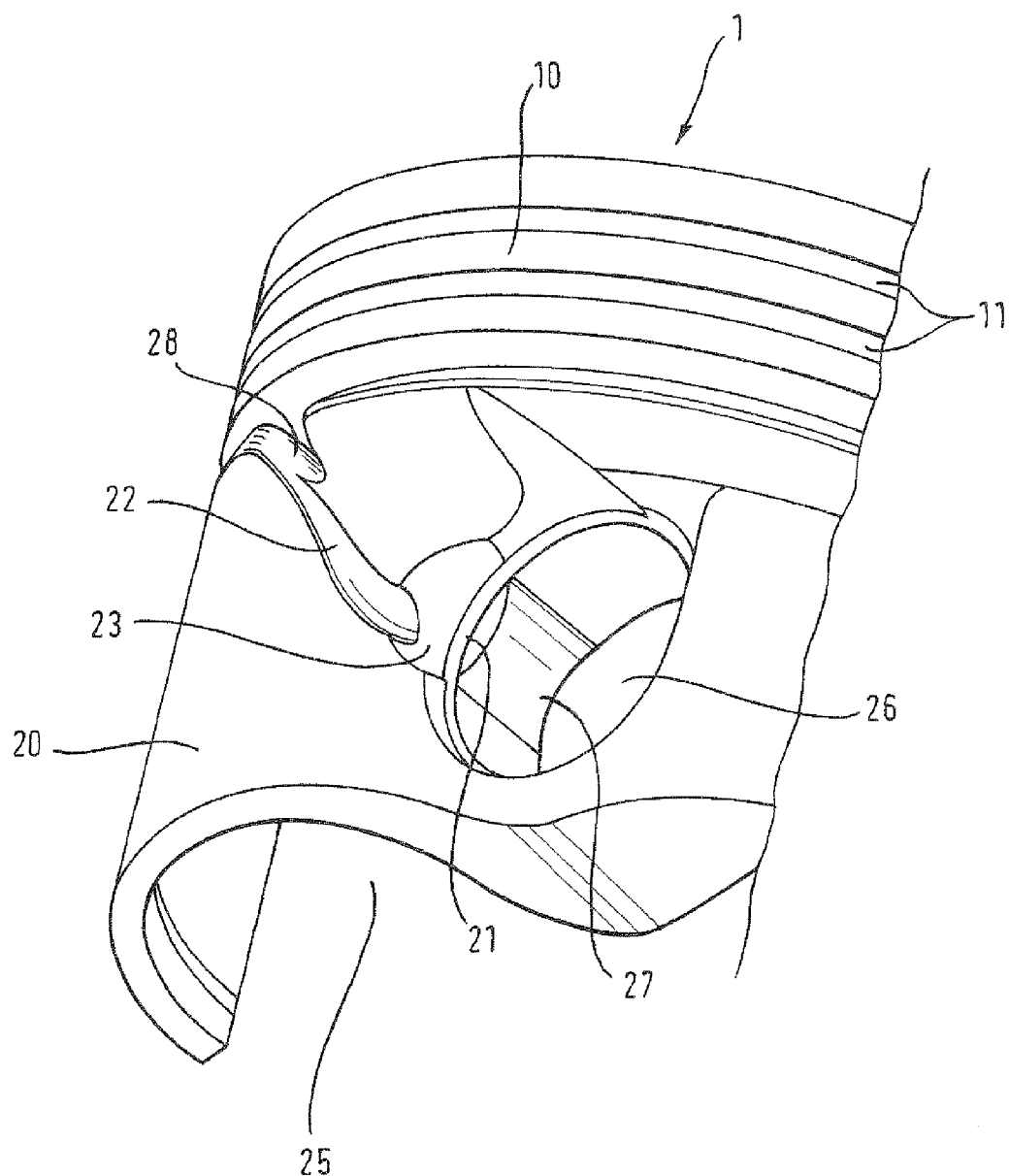

PISTON HAVING OIL SUPPLY CHANNEL FOR HUB BORE HOLES

BACKGROUND OF THE INVENTION

1. Technical Field

The invention concerns a piston having an oil duct for an internal combustion engine.

2. Related Art

Pistons for internal combustion engines are exposed to extremely high mechanical and thermal loads during operation so that it has to be ensured that the cylinder and piston portions that are exposed to constant friction due to their motion are sufficiently cooled and lubricated in order to keep friction as low as possible.

One measure is to provide in the piston an annular circumferential cooling channel in the region of the piston crown, for example, into which a cooling means, such as oil can be injected by means of at least one inlet opening. The supply of cooling oil is usually effected during the down stroke, while the piston moves toward an oil spray nozzle. The discharge of oil is usually performed by pressing the oil through inertial forces against the lower side of the cooling channel during the upstroke of the piston and pressing it out of the cooling channel.

The lubrification in the four-stroke engine is, for example, effected by means of a pump supplying the oil to the lubricating points. Such a lubricating point is inter alia present between the piston and the cylinder wall. Due to the motion of the piston, a certain amount of oil is wiped off the piston crown and may spread along the piston circumference to other regions of the piston, too. Here, the movable portions between the bolt opening/bolt and bolt/upper connecting rod eye need to be emphasized as lubrication is absolutely necessary in these regions but a direct supply of lubricating oil is difficult. The reason for this is that these regions are subject to a permanent up-and-down movement and are, thus, difficult to access.

In the prior art, the small connecting rod eye and also the bolt receive the oil through spray oil (oil mist) and/or through a bore in the shaft of the connecting rod. Oil leaking from the connecting rod bearings of the crank shaft is indirectly thrown by centrifugal force onto the cylinder walls and also the above-mentioned regions. The generation of an oil mist may be effected in various ways. For example, oil spray nozzles and/or lubrication pins may be provided in order to uniformly distribute the oil.

In the prior art, due to this indirect oil supply to the lubricating points around the bolt opening and around the upper (small) connecting rod eye it may happen that these regions can be supplied with splash oil only insufficiently and/or in an undefined manner.

JP 08 121 243 discloses a piston for an internal combustion engine having a protruding portion and a recessed portion in the region of the bolt opening. DE 10 2005 041 001 A1 discloses a light-weight piston in which a connection between an annular groove and the bolt opening is provided.

WO 2006/072293 A1 concerns a piston in which an oil conduit is provided toward a so-called window face at the lower side of the piston and, thus, toward an oil pan.

SUMMARY OF THE INVENTION

It is an object of the invention to improve the lubricating oil supply of the bolt opening/bolt and bolt/upper connecting rod eye portions that are subject to friction.

Thus, a piston for an internal combustion engine comprises a piston crown and a piston base, wherein a cavity is provided in the piston base and bolt openings are provided in a piston base wall forming the cavity, which bolt openings may also be termed bolt bores. The piston is characterized in that (outside) at the outer circumferential surface of the piston base at least one oil guide is provided the direction of which has an axial component with respect to the piston axis and which oil guide extends from the piston crown substantially in the direction of the bolt opening. In this way, it is ensured that the oil wiped-off from the piston crown during the up-and-down motion of the piston runs into regions predetermined by the oil duct. In order to transport the wiped-off oil collecting in the lower piston crown area towards portions of the piston base, the oil duct comprises an axial component. A part of the oil wiped-off during a downward motion of the piston is transported along the oil guide during an upstroke, following its inertia. In order to achieve a direct and defined lubrication of the bolt opening, the piston has an oil guide extending from the piston crown substantially directly in the direction of the bolt opening. Thus it is ensured that the oil wiped-off from the piston crown during the up-and-down motion of the piston runs into the bolt opening region to be lubricated. In other words, there is a defined guide of the oil substantially along the entire and substantially the shortest distance from the piston head to the bolt opening, which guide at least preferably does not comprise any bending or deflection.

Preferably, at least one lateral recess (side relief) is provided in the bolt opening (bolt bore) of the piston, which may receive and store lubricating oil. By means of an oil guide according to the invention, such a lateral recess may be supplied in a targeted manner, which due to its form may in turn deliver lubricating oil to the friction surfaces. It is to be observed that the term "oil" of course comprises other lubricating and/or cooling means, too, as long as they have a suitable viscosity in order to move and disperse along an oil channel.

Preferably, a retaining ring (locking ring) may be inserted into the bolt opening. The retaining ring prevents unwanted displacement of the bolt.

Preferably, at least one oil guide opening is provided in the cylindrical piston, which connects the cavity or lateral recess with the oil channel. Such an oil guide opening provides a suitable means for supplying the cavity and possibly the lateral recesses of the bolt opening with oil in a targeted manner. In this way, the bolt not only receives oil from the direction of the outer piston side but also from the direction of the inner piston side. Therefore, the lubricant may disperse in a particularly easy manner along the piston also between the frictional surfaces of the bolt and the small connecting rod eye. Further, the oil present in the cavity and possibly in the lateral recesses of the cavity also serves as splash oil which is particularly likely to reach the regions to be lubricated or bolt openings/bolts and bolt/upper connecting rod eye due to its close distance (vicinity).

Preferably, the oil guide opening and the bolt opening are formed continuously. A continuous configuration of the bolt opening and the oil guide opening is advantageous from the point of view of manufacture. The oil is, thus, conducted behind the retaining ring into the lateral recesses and the cavity, respectively.

Preferably, the oil guide is a groove. Introducing a groove into the circumferential area of the piston is a simple and cheap manner to provide an oil guide according to the present invention.

Preferably, the piston crown-side end of the oil guide groove is funnel-shaped and/or tapered so that the wiped-off oil preferably flows into the oil guide groove. In this manner, the distribution and dosage of the oil may be influenced by means of the shape.

Preferably, two oil guide grooves are provided for one bolt opening in order to uniformly lubricate the bolt opening from two sides.

Preferably, the oil guide has an elongate shape along the guide direction. An oil guide the extension of which in the direction of the guide is substantially larger than in a direction in particular thereto hardly weakens the piston structurally.

BRIEF DESCRIPTION OF THE DRAWINGS

In the following, an embodiment of the invention shown in the sole drawing FIGURE is discussed in more detail.

The sole drawing FIGURE schematically shows a partial perspective view of a piston according to the invention.

DETAILED DESCRIPTION OF AN EMBODIMENT OF THE INVENTION

The FIGURE shows a detail of an inventive piston 1 having a piston crown 10 and a piston base 20. The piston crown is of cylindrical shape and is provided with annular grooves (ring grooves) 11 and oil rings which are not shown. In the FIGURE, a piston base 20 having a cavity 25 adjoins the piston crown 10 from below. Like in the present case, the piston base 20 does not need to have any circular cylindrical shape. In the present embodiment, the piston base 20 comprises walls recessed from the periphery and forming a box-shaped piston base. In the peripheral region of the piston base 20, two opposite pin openings 26 for receiving a pin are provided. In the FIGURE, only one part of the piston having a single pin opening 26 is shown. These pin openings 26 can, as shown in the FIGURE, be provided with a locking ring 21 received in a groove formed in the pin opening 26. In the FIGURE, a pin (not shown) is supported in the pin openings 26, which pin serves as axis for the small connecting rod eye of a connecting rod (not shown). The cavity 25 of piston 1 is configured so that the connecting rods may rotate around the pin with an amplitude determined by the stroke of the piston 1, the connecting rod and the crank shaft.

In the piston 1 of the present embodiment, an oil guide groove 22 extends from the lower end of the piston crown 10 substantially directly in the direction of the pin opening 26 in the outer peripheral surface of the pin base. Further, the piston base 20 has an oil guide opening 23 in the vicinity of the pin opening 26. The oil guide opening 23 connects the end of the oil guide groove 22 at the side of the pin opening with a lateral recess (side relief) 27 of the pin opening 26.

A part of the oil wiped off the piston crown 10 during a downward stroke of the piston 1 in the cylinder, collects at first at the end of the oil guide groove 22 at the side of the piston crown and, during the upward stroke, preferably flows due to its inertia along the oil crown groove 22 in the defined regions predetermined by the oil crown opening 23 in the vicinity of the pin opening 26 and the lateral recesses 27 in the pin opening 26. The oil thus arrives directly and in a guided manner into the regions to be lubricated, in particular to the friction centers pin opening/pin and pin/upper connecting rod eye.

The end of the oil guide groove 22 at the piston crown side may be configured so that oil is increasingly collected before it moves along the oil guide groove 22 in the direction of the pin opening 26. In particular, the end of the oil guide groove 22 at the piston crown side may have a funnel-shape or be tapered so that the wiped-off oil preferably flows into the oil guide groove 22 through a recess 28 formed thereby. In a similar manner, also the end of the oil guide groove 22 at the pin opening side may influence the distribution of oil through its shape. In particular, this end may at least partially include the pin opening 26 in order to distribute the oil uniformly around the pin opening 26, or around the pin. Moreover, by the specific configuration of the oil guide groove 22 and its ends, a targeted dosage of the oil that is to be guided in the direction towards the pin opening 26 may be performed.

Several oil guide grooves 22 for one or more pin openings 26 may be provided, which grooves may be configured to have a different shape and length. In particular, two oil guide grooves 22 lend themselves for one pin opening 26 in order to uniformly lubricate the pin opening 26 from two sides.

Finally it is to be mentioned that the oil guide does not have to be provided in form of a groove, channel or recess. Specifically, it is possible to form a guide by one or more protruding edges or suitable coatings. Here, a defined flow path may be achieved by means of surface effects of the lubricant, the piston material and the oil guide.

The invention claimed is:

1. Piston for internal combustion engines, comprising a piston crown including at least one ring groove and a piston base, wherein a cavity is provided in the piston base and pin openings are provided in a piston base wall forming the cavity, wherein at least one oil guide is provided at the outer peripheral surface of the piston base, the oil guide extending from the piston crown to a pin opening, at least one lateral recess is provided in the pin opening, and the oil guide includes a groove extending along the outer peripheral surface of the piston base between the piston crown and the pin opening in a direction which is not parallel to the at least one ring groove.

2. Piston according to claim 1, wherein a locking ring is inserted in the pin opening.

3. Piston according to claim 1, wherein at least one oil guide opening is provided, which connects the lateral recess with the oil guide groove.

4. Piston according to claim 3, wherein the oil guide opening and the pin opening are formed continuously.

5. Piston according to claim 1, wherein an end of the oil guide groove at the piston crown side has a funnel-shape and/or is tapered.

6. Piston according to claim 1, wherein the direction of the oil guide has an axial component with respect to the piston axis.

7. Piston according to claim 1, wherein the oil guide groove extends continuously from the piston crown to the oil guide opening.

* * * * *